US012260003B1

(12) United States Patent
Chau et al.

(10) Patent No.: US 12,260,003 B1
(45) Date of Patent: Mar. 25, 2025

(54) CLEAN ROOM GENERATION FOR DATA COLLABORATION AND EXECUTING CLEAN ROOM TASK IN DATA PROCESSING PIPELINE

(71) Applicant: Databricks, Inc., San Francisco, CA (US)

(72) Inventors: William Chau, Redwood City, CA (US); Abhijit Chakankar, San Jose, CA (US); Stephen Michael Mahoney, Portland, OR (US); Daniel Seth Morris, Cranford, NJ (US); Itai Shlomo Weiss, River Vale, NJ (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/474,708

(22) Filed: Sep. 26, 2023

Related U.S. Application Data

(63) Continuation of application No. 18/473,992, filed on Sep. 25, 2023.

(51) Int. Cl.
*G06F 21/00* (2013.01)
*G06F 21/62* (2013.01)

(52) U.S. Cl.
CPC ................... *G06F 21/6281* (2013.01)

(58) Field of Classification Search
None
See application file for complete search history.

(56) References Cited

U.S. PATENT DOCUMENTS

| | | | |
|---|---|---|---|
| 10,970,419 B1 * | 4/2021 | Blum | G06F 21/6254 |
| 10,999,355 B1 | 5/2021 | Chu et al. | |
| 11,138,340 B1 * | 10/2021 | Blum | G06F 16/27 |
| 11,347,886 B1 * | 5/2022 | Langseth | H04L 63/0428 |
| 11,651,287 B1 * | 5/2023 | Kostakis | G06F 8/61 |
| | | | 706/12 |
| 2007/0106754 A1 * | 5/2007 | Moore | G16H 40/20 |
| | | | 707/E17.116 |
| 2016/0004820 A1 * | 1/2016 | Moore | G16H 15/00 |
| | | | 705/3 |
| 2021/0399911 A1 * | 12/2021 | Jorasch | H04L 12/1822 |
| 2023/0004669 A1 * | 1/2023 | Langseth | G06F 16/258 |
| 2023/0351247 A1 * | 11/2023 | Chen | H04W 12/033 |
| 2023/0401200 A1 * | 12/2023 | Blum | G06F 16/24552 |
| 2023/0401260 A1 * | 12/2023 | Bijon | G06F 16/90335 |
| 2024/0062098 A1 | 2/2024 | Blum et al. | |

* cited by examiner

*Primary Examiner* — Hasanul Mobin
(74) *Attorney, Agent, or Firm* — Fenwick & West LLP

(57) ABSTRACT

A data processing service facilitates the creation and processing of data processing pipelines that process data processing jobs defined with respect to a set of tasks in a sequence and with data dependencies associated with each separate task such that the output from one task is used as input for a subsequent task. In various embodiments, the set of tasks include at least one cleanroom task that is executed in a cleanroom station and at least one non-cleanroom task executed in an execution environment of a user where each task is configured to read one or more input datasets and transform the one or more input datasets into one or more output datasets.

20 Claims, 16 Drawing Sheets

Workflows > Jobs >
Job name
Runs  Tasks

Create Job Window
1002

Job name *
Clean room task

Type *
Clean room

Clean Room *
My Clean room

Cluster *
cluster (M)

Output parameters ⓘ
external target location
Add parameter ˅

Parameters
Add parameter ˅

Notebook *
Select notebook value

Cancel    Create

Create Job Icon
1004

FIG. 10

CLEAN ROOM GENERATION FOR DATA COLLABORATION AND EXECUTING CLEAN ROOM TASK IN DATA PROCESSING PIPELINE

CROSS-REFERENCE TO THE RELATED APPLICATION

This application is a continuation of U.S. patent application Ser. No. 18/473,992, filed Sep. 25, 2023. This application is incorporated herein by reference in its entirety for all purposes.

TECHNICAL FIELD

The disclosed configuration relates generally to data clean rooms, and more particularly to generating a data clean room.

BACKGROUND

Oftentimes, different entities desire to collaborate on data processing tasks using the data or other assets of each entity. However, there are typically restrictions on the extent or way in which the data is exposed to other entities due to, for example, privacy or sensitive information in the data. For example, a set of advertisers each having access to first-party data may desire to collaborate in order to see how each advertiser's data matches up with the aggregated data from other advertisers without gaining exposure to the other advertisers' sensitive and private data. An advertiser may have data for a number of data dimensions and be interested in inferring data for one or more additional dimensions from another participant by comparing their data. Accordingly, the advertisers can see how the different data sets match up, using any inconsistencies between the two to determine whether, for example, they are over-serving ads to the same audiences. However, it is difficult to do so as the collaboration may result in significant coordination between the participants or a separate entity that coordinates the data and the processing task on behalf of the participants.

BRIEF DESCRIPTION OF THE DRAWINGS

FIGS. 5-11 illustrate user interfaces provided by a data processing service for creating a clean room task, in accordance with an embodiment.

Figure 1:
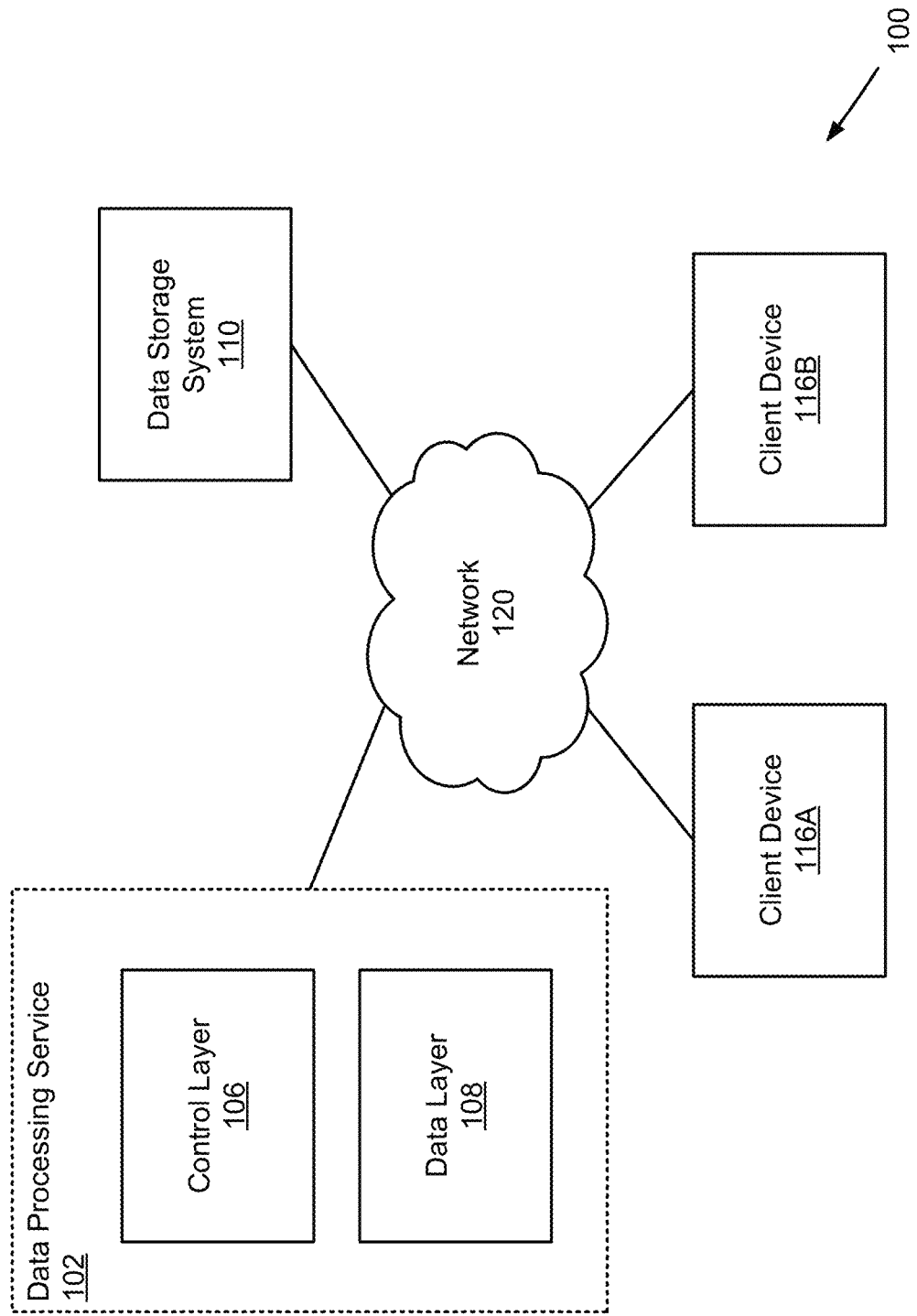
FIG. 1 is a high-level block diagram of a system environment for a data processing service, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

Overview

A data processing service provides a secure, privacy-protecting environment where two or more parties can share sensitive enterprise data, including customer data, for measurements, insights, activation and other use cases. This is known as a data clean room. The clean room, in accordance with various embodiments of the present disclosure, is a collaboration space to enable customers to query external private data with no direct data access. As described herein, in one embodiment, all collaborators are equal in the clean room; there is no collaborator who has more privileges than another. Accordingly, multiple organizations can join data in an isolated privacy-sensitive environment where each party is not given direct access to the other party's data.

A data processing service, in one embodiment, receives a request from a first collaborator to create a clean room for data sharing collaboration with one or more other collaborators including at least a first collaborator and a second collaborator. The data processing service receives from the second collaborator, an add request to add a notebook into the clean room that is executable on one or more data tables of the set of collaborators. Explicit or implicit approval from each collaborator may be required before a notebook can be executed using any data table shared into the clean room station. In response, the data processing service creates a clean room station after receiving a request to execute the notebook. The clean room station is an execution environment separate from the data environment of the first collaborator and the other collaborators. In various embodiments, clean room station creation provisions a separate metastore and a workspace, so that the execution is fully isolated. The data processing service performs a notebook job to execute the notebook on one or more cluster computing resources of the data processing service to generate an output for the notebook job.

To ensure data security and equality among collaborators, the data processing service may require each collaborator to approve the notebook used to analyze the data shared into the clean room before the notebook can be executed using the data. This includes requiring approval after changes are made to the notebook by one or more of the collaborators. Thus, the data processing service will not execute a notebook unless approval is received from each collaborator. To achieve this requirement, the data processing service generates a notebook approval hash for each approval by combining a notebook content hash with one or more properties of the notebook. Thus, the notebook content hash prevents an approved notebook from being executed after the notebook has been modified.

Oftentimes, other types of clean rooms may impose different types of restrictions, with respect to the types of assets that can be shared into the clean room and the code being executed within the clean room. Moreover, they may grant most or all of the authority for approving and executing the tasks within a clean room to one or a small subset of collaborators. By generating the clean room station described in detail herein, collaborators can flexibly share various types of assets to the clean room and the task may execute if all collaborators approve of the task.

Additionally, the data processing service facilitates the creation and processing of data processing pipelines that process data processing jobs defined with respect to a set of tasks. In various embodiments, the set of tasks include at least one clean room task that is executed in association with a workspace of clean room station and at least one non-clean room task executed in an execution environment of a user where each task is configured to read one or more input datasets and transform the one or more input datasets into one or more output datasets.

In operation, the data processing service receives a request to generate a data processing job from a client device of a first user. The request, in one embodiment, includes a definition of the set of tasks to be performed by the data processing service in a defined sequence and with particular data dependencies associated with each separate task (e.g., the output from one task is used as input for a subsequent task, etc.). Accordingly, the data processing service processes a first non-clean room task in a first execution environment (e.g., first VPC) of the first user. The data processing service obtains a first output from the first non-clean room task in the first execution environment of the first user and provides the first output of the first non-clean room task into the clean room station (e.g., separate VPC for clean room station).

The data processing service then processes a clean room task using the first output and at least one of a notebook or data table shared into the clean room station by another user to generate a second output of the data processing job. The clean room task is processed in the clean room station that is managed by the data processing service and is separate and isolated from the execution environments of either the first user or an execution environment of the other user. After obtaining the second output from the clean room task executed in the clean room station, the data processing service provides the second output into the execution environment of the first user to process a next task of the data processing job. Accordingly, the data processing service processes a second non-clean room task in the execution environment of the first user using the second output to generate a third output of the data processing job.

In various embodiments, the first non-clean room task and the second non-clean room task are executed on one or more first cluster computing resources of the data processing service and the clean room task is executed on a different one or more clean room station cluster computing resources of the data processing service.

Data Processing Service System Environment

FIG. 1 is a high-level block diagram of system environment 100 for data processing service 102, in accordance with an embodiment. System environment 100 shown in FIG. 1 includes data storage system 110, clean room cluster 112, client devices 116A, 116B, network 120, and data processing service 102. In alternative configurations, different and/or additional components may be included in system environment 100.

Data processing service 102 is a service for managing and coordinating data processing services (e.g., database services) to users of client devices 116. Data processing service 102 may manage one or more applications that users of client devices 116 can use to communicate with data processing service 102. Through an application of data processing service 102, data processing service 102 may receive requests (e.g., database queries) from users of client devices 116 to perform one or more data processing functionalities on data stored, for example, in data storage system 110. The requests may include query requests, analytics requests, or machine learning and artificial intelligence requests, and the like, on data stored by data storage system 110. Data processing service 102 may provide responses to the requests to the users of client devices 116 after they have been processed.

In one embodiment, as shown in system environment 100 of FIG. 1, data processing service 102 includes control layer 106 and data layer 108. The components of data processing service 102 may be configured by one or more servers and/or a cloud infrastructure platform. In one embodiment, control layer 106 receives data processing requests and coordinates with data layer 108 to process the requests from client devices 116. Control layer 106 may schedule one or more jobs for a request or receive requests to execute one or more jobs from the user directly through a respective client device 116. Control layer 106 may distribute the jobs to components of data layer 108 where the jobs are executed.

Control layer 106 is additionally capable of configuring clusters in data layer 108 that are used for executing the jobs. For example, a user of client device 116 may submit a request to control layer 106 to perform one or more queries and may specify that four clusters on data layer 108 be activated to process the request with certain memory requirements. Responsive to receiving this information, control layer 106 may send instructions to data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

Data layer 108 thus may be accessed by, for example, a developer through an application of control layer 106 to execute code developed by the developer. In one embodiment, a cluster in data layer 108 may include multiple worker nodes that execute multiple jobs in parallel. Responsive to receiving a request, data layer 108 divides the cluster computing job into a set of worker jobs, provides each of the worker jobs to a worker node, receives worker job results, stores job results, and the like. Data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

Data storage system 110 includes a device (e.g., a disc drive, a hard drive, a semiconductor memory) used for storing database data (e.g., a stored data set, portion of a stored data set, data for executing a query). In one embodiment, data storage system 110 includes a distributed storage system for storing data and may include a commercially provided distributed storage system service. Thus, data storage system 110 may be managed by a separate entity than an entity that manages data processing service 102 or data management system 110 may be managed by the same entity that manages data processing service 102.

Client devices 116 are computing devices that display information to users and communicates user actions to the systems of system environment 100. While two client devices 116A, 116B are illustrated in FIG. 1, in practice many client devices 116 may communicate with the systems of system environment 100. In one embodiment, client device 116 is a conventional computer system, such as a desktop or laptop computer. Alternatively, client device 116 may be a device having computer functionality, such as a personal digital assistant (PDA), a mobile telephone, a smartphone or another suitable device. Client device 116 is configured to communicate via network 120, which may comprise any combination of local area and/or wide area networks, using both wired and/or wireless communication systems.

In one embodiment, client device 116 executes an application allowing a user of client device 116 to interact with the various systems of system environment 100 of FIG. 1. For example, client device 116 can execute a browser application to enable interaction between client device 116 and data processing system 106 via network 120. In another embodiment, client device 116 interacts with the various systems of system environment 100 through an application programming interface (API) running on a native operating system of client device 116, such as IOS® or ANDROID™.

Figure 2:
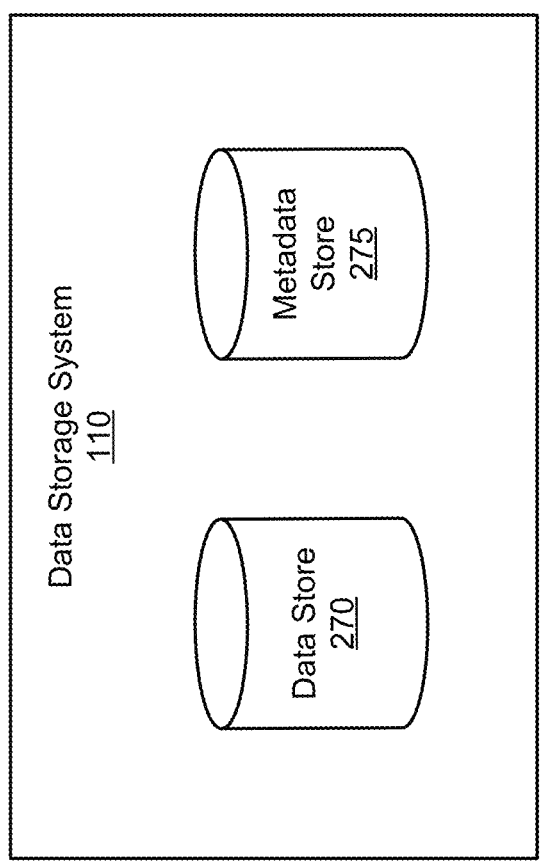
FIG. 2 illustrates a block diagram of an architecture of a data storage system, in accordance with an embodiment.

FIG. 2 is a block diagram of an architecture of data storage system 108, in accordance with an embodiment. In one embodiment, data storage system 108 includes data ingestion module 250. Data storage system 108 also includes data tables store 270 and metadata store 275.

Data store 270 stores data associated with different tenants of data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in data store 270 in conjunction with metadata stored in metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of client device 116. As another example, a transaction may be initiated according to policies of data processing service 102. Thus, a transaction may write one or more changes to data tables stored in data storage system 110.

In one embodiment, a new version of the data table is committed when changes of a respective transaction are successfully applied to the data table of data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity and may indicate the specific changes to individual records with an indication of whether the record was inserted, deleted, or updated due to the corresponding transaction.

Figure 3:
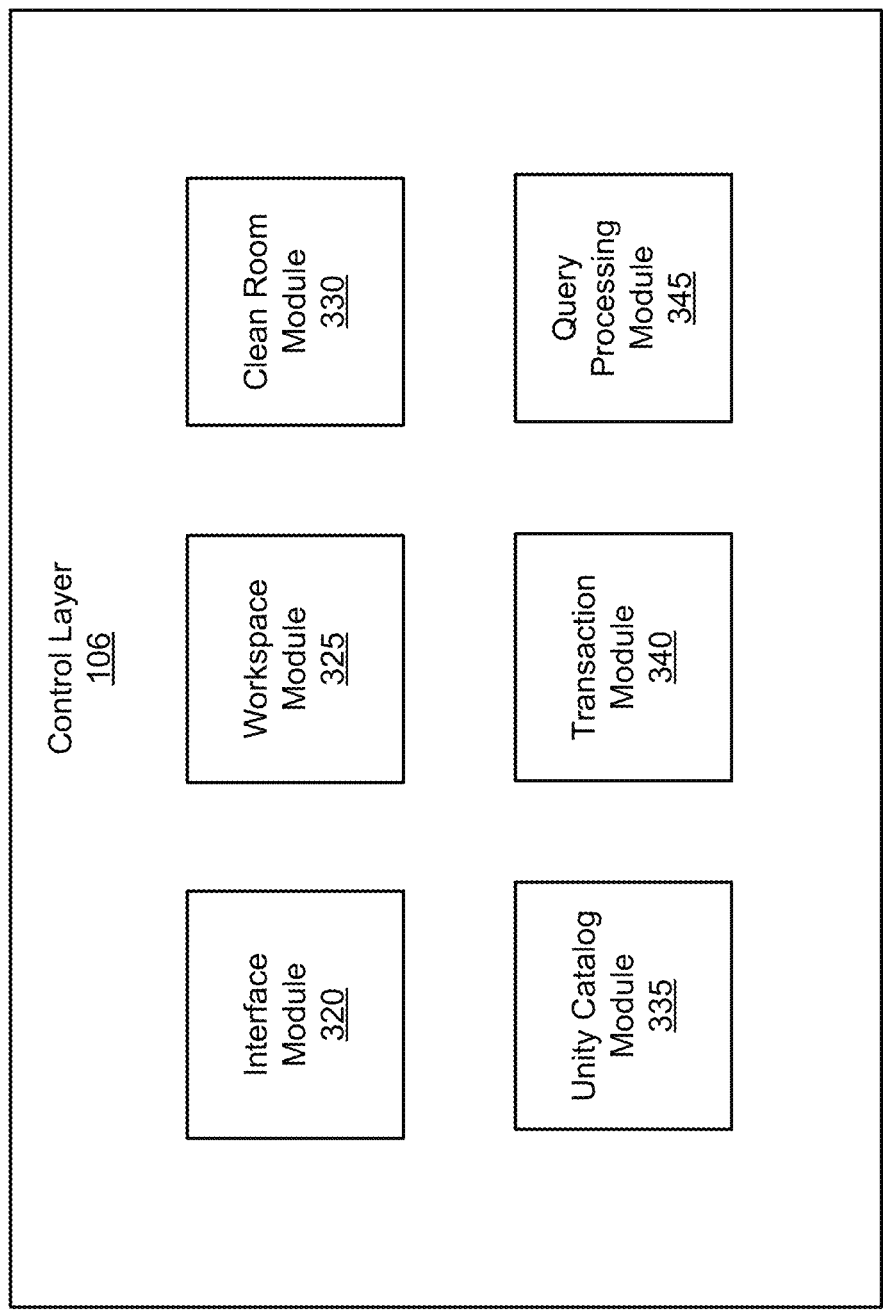
FIG. 3 illustrates a block diagram of an architecture of a control layer, in accordance with an embodiment.

FIG. 3 is a block diagram of an architecture of control layer 106, in accordance with an embodiment. In one embodiment, control layer 106 includes interface module 320, workspace module 325, clean room module 330, unity catalog module 335, transaction module 340, and query processing module 345.

Interface module 320 provides an interface and/or a workspace environment where users of client devices 116 (e.g., users associated with tenants) can access resources of data processing service 102. For example, the user may retrieve information from data tables associated with a tenant, submit data processing requests such as query requests on the data tables, through the interface provided by interface module 320. The interface provided by interface module 320 may provide access to notebooks, libraries, experiments, queries submitted by the user. In one embodiment, a user may access the workspace via a user interface (UI), a command line interface (CLI), or through an application programming interface (API) provided by workspace module 325.

For example, a notebook associated with a workspace environment is a web-based interface to a document that includes runnable code, visualizations, and explanatory text.

A user may submit data processing requests on data tables in the form of one or more notebook jobs. In one embodiment, when the job is executed within cluster compute resources within the dedicated workspace of the user, the user provides code for executing the one or more jobs and indications such as the desired time for execution, number of cluster worker nodes for the jobs, cluster configurations, a notebook version, input parameters, authentication information, output storage locations, or any other type of indications for executing the jobs. Alternatively, in another embodiment, when the job is executed in a serverless environment where cluster compute resources are directly managed by the data processing service 102, the user provides code for executing one or more jobs and the data processing service 102 may automatically configure the various parameters during compute. The user may also view or obtain results of executing the jobs via the workspace.

Workspace module 325 deploys workspaces within data processing service 102. A workspace as defined herein may refer to a deployment in the cloud that functions as an environment for users of the workspace to access assets. An account of data processing service 102 represents a single entity that can include one or multiple workspaces. In one embodiment, an account associated with data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

Clean room module 330 creates and manages accounts and metastores for clean room environments between one or more collaborators, and also communicates with the workspace module 325 to create the clean room station that facilitates data sharing between collaborators. As described elsewhere herein, the clean room station is an execution environment separate from data environment (e.g., data layer 108) of each collaborator that is party to a clean room. Additionally, as described below, the clean room module 330 is in communication with unity catalog module 335 to create a metastore for the clean room station. In one embodiment, clean room module 330 initiates secure clean room cluster 112 to execute clean room tasks or notebook jobs, as they are variously referred to. A more detailed description of execution of jobs within the clean room is provided below.

Unity catalog module 335 is a fine-grained governance solution for managing assets within data processing service 102. It helps simplify security and governance by providing a central place to administer and audit data access. In one embodiment, unity catalog module 345 maintains a metastore for a respective account (and/or multiple metastores for multiple accounts). A metastore is a top-level container of objects for the account. The metastore may store data objects and the permissions that govern access to the objects. A metastore for an account can be assigned to one or more workspaces associated with the account. In one embodiment, unity catalog module 335 organizes data as a three-level namespace, a catalogue is the first layer, a schema (also called a database) is the second layer, and tables and views are the third layer.

In one embodiment, unity catalog module 335 enables read and write of data to data stored in cloud storage of data storage system 110 on behalf of users associated with an account and/or workspace. In one instance, unity catalog module 335 manages storage credentials and external locations. A storage credential represents an authentication and authorization mechanism for accessing data stored on data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is also subject to access-control policies that control which users and groups can access the storage credential. Therefore, if a user does not have access to a storage credential in unity catalog module 335, the unity catalog module 335 does not attempt to authenticate to the data storage system 110.

In one embodiment, unity catalog module 335 allows users to share assets of a workspace and/or account with users of other accounts and/or workspaces. For example, users of Company A can configure certain tables owned by Company A that are stored in data storage system 110 to be shared with users of Company B. As another example, as described below, users of Company A can share the tables with the workspace associated with a clean room station. Each organization may be associated with separate accounts on data processing service 102. Specifically, a provider entity can share access to one or more tables of the provider with one or more recipient entities.

Responsive to receiving a request from a provider to share one or more tables (or other data objects), unity catalog module 335 creates a share in the metastore of the provider. A share is a securable object registered in the metastore for a provider. A share contains tables and notebook files from the provider metastore that the provider would like to share with a recipient. A recipient object or securable is an object that associates an organization with a credential or secure sharing identifier allowing that organization to access one or more assets that are shared by the provider. In one embodiment, a provider can define multiple recipients for a given metastore. Unity catalog module 335 in turn may create a provider object or securable in the metastore of the recipient that stores information on the provider and the tables that the provider has shared with the recipient. In this manner, a user associated with a provider entity can securely share tables of the provider entity that are stored in a dedicated cloud storage location in data storage system 110 with users of a recipient entity by configuring shared access in the metastore.

Transaction module 340 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

Query processing module 345 receives and processes queries that access data stored by data storage system 110. Query processing module 345 may reside in control layer 106. The queries processed by query processing module 345 are referred to herein as database queries. The database queries are specified using a declarative database query language such as SQL. Query processing module 345 compiles a database query specified using the declarative database query language to generate executable code that is executed. Query processing module 345 may encounter runtime errors during execution of a database query and returns information describing the runtime error including an origin of the runtime error representing a position of the runtime error in the database query. In one embodiment, query processing module 345 provides one or more queries to appropriate clusters of data layer 108, and receives responses to the queries from clusters in which the queries are executed.

Figure 4:
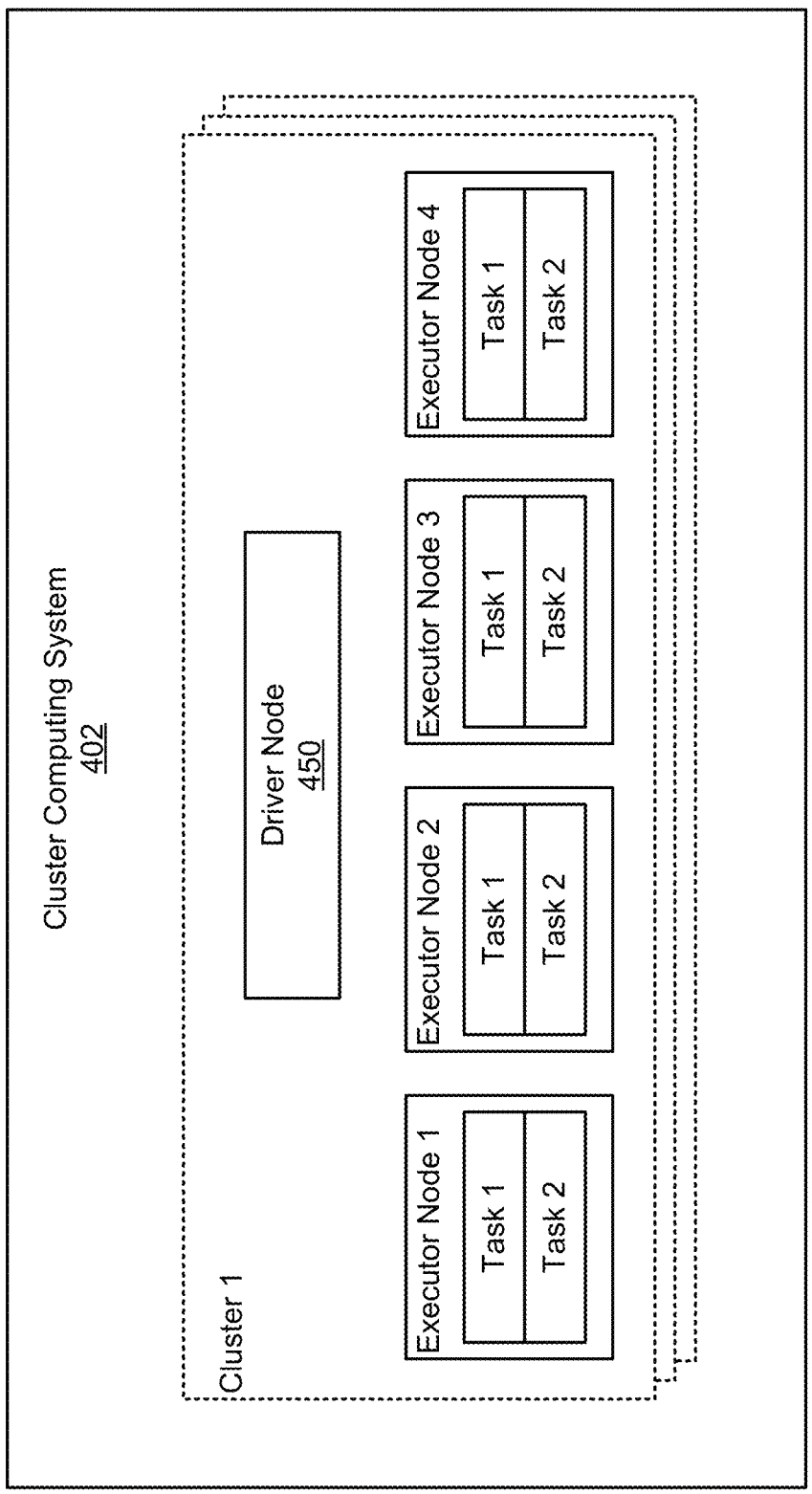
FIG. 4 illustrates a block diagram of an architecture of a cluster computing system of the data layer, in accordance with an embodiment.

FIG. 4 is a block diagram of an architecture of cluster computing system 402 of data layer 108, in accordance with an embodiment. In some embodiments, cluster computing system 402 of data layer 108 includes driver node 450 and worker pool including multiple executor nodes.

Driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from query processing module 345. Driver node 450 may compile a database query and generate an execution plan. Driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to driver node 410. According to an embodiment, an executor node executes the generated code for the database query for a particular subset of data that is processed by the database query. The executor nodes execute the query based on the received information from driver node 450.

Clean Room Generation

Data processing service 102 provides a secure, privacy-protecting environment where two or more parties collaborator can share sensitive enterprise data, including customer data, for measurements, insights, activation and other use cases. As described above, this is known as a data clean room. Multiple organizations can join data in an isolated privacy-sensitive environment where each party is not given direct access to the other party's data.

To generate a clean room for data collaboration, data processing service 102 receives a request from a first collaborator to create a clean room. The first collaborator accesses their account with data processing service 102 though interface module 320, which provides the first collaborator with a user interface to access their data and other services provided by data processing services 102. One of these services is creation of a clean room to facilitate data collaboration with other entities.

Figure 5:
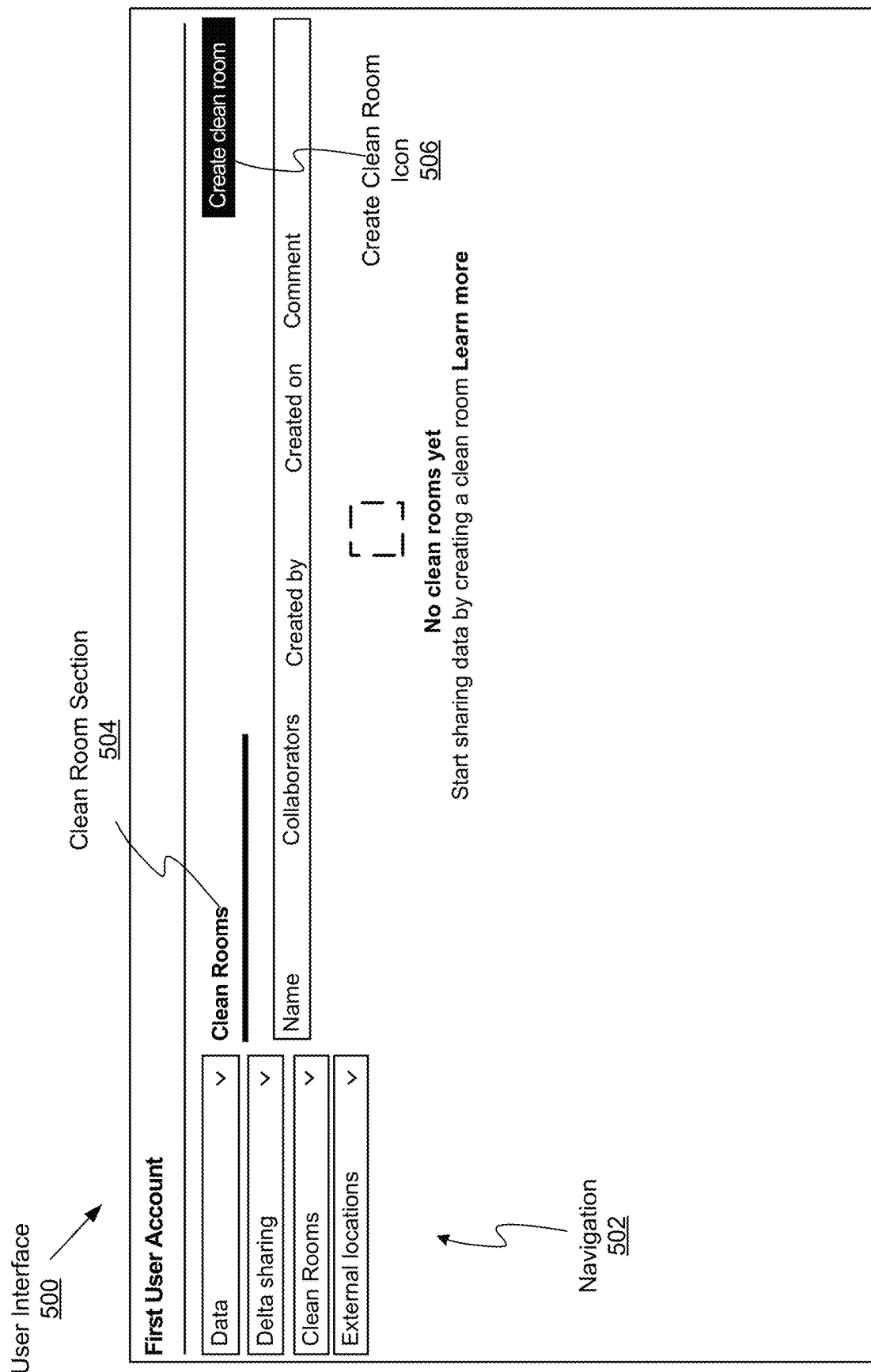

FIG. 5 illustrates an example user interface 500 for navigating a user account at data processing service 102, in accordance with one or more embodiments. In this example, a user is logged into their user account with data processing service 102 and has selected an option within navigation pane 502 to navigate to their clean room section 504. In this example, the user does not have any existing clean rooms, as indicated by the "No clean rooms yet" text in the section that would list their available clean rooms if there had been any. Accordingly, in this example, the user selects create clean room icon 506 to request creation of a new clean room.

Figure 6:
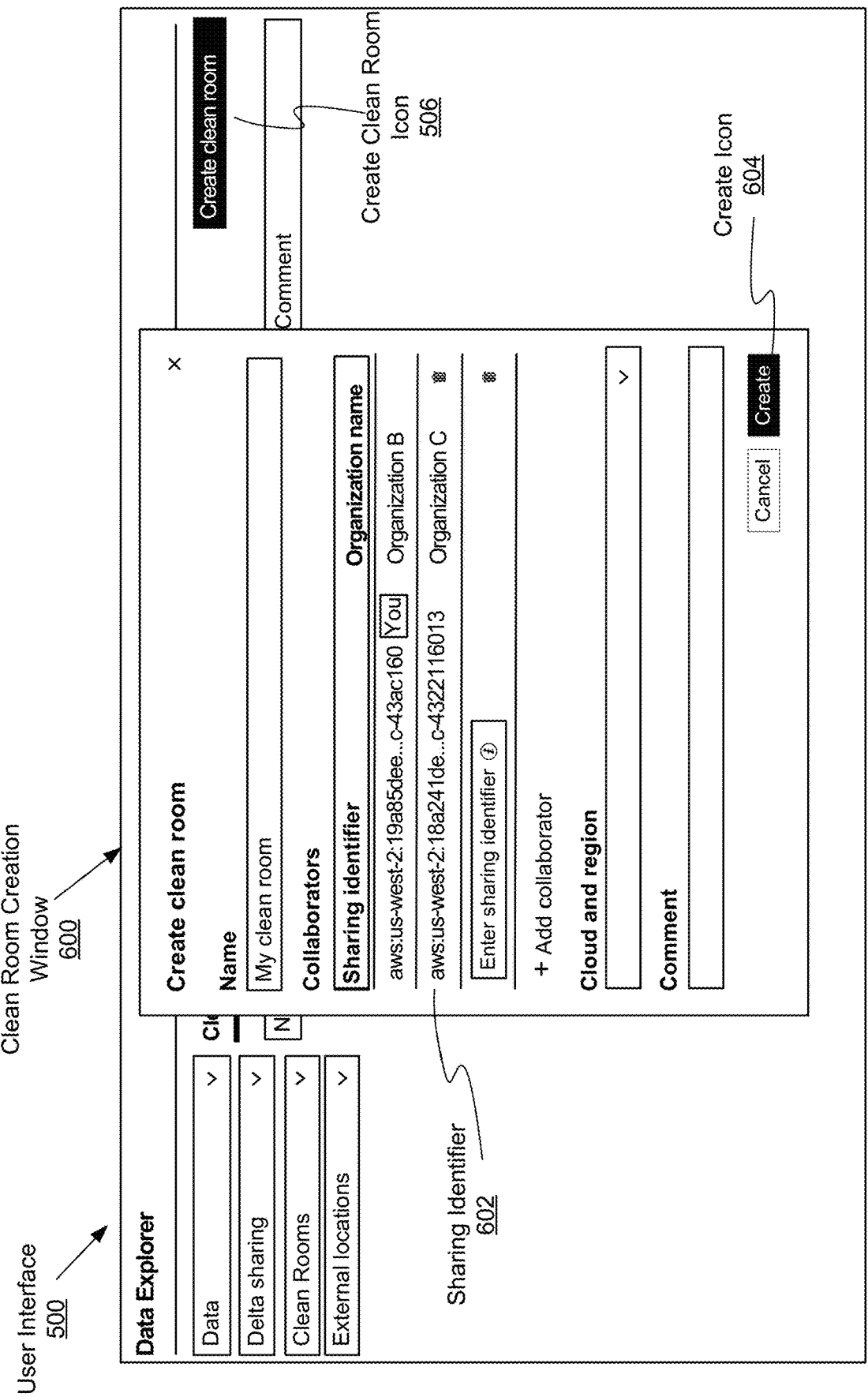

FIG. 6 illustrates clean room creation window 600, in accordance with one or more embodiments. In response to selecting create clean room icon 506, data processing service 102 presents clean room creation window 600 to configure the new clean room. Accordingly, clean room creation window 600 allows the user to name the clean room, invite or add collaborators to the clean room via a unique sharing identifier 602, and specify other configuration options. In one embodiment, clean room creation window 600 allows the user to specify where they want to save the output of the collaborations (e.g., by specifying a particular S3 bucket). Accordingly, after the user has provided the necessary information to configure the new clean room, the user selects create icon 604 to request creation of the new clean room from data processing service 102.

In response to receiving the request, data processing service 102 creates a new clean room and an account associated with the clean room. The clean room is an execution environment separate from the data environment of the user and the other collaborators. In one embodiment, the clean room is associated with metadata (or a configuration) that maps assets (data, images, code, etc.) of the user and the other collaborators together. Accordingly, creating a new clean room environment that is fully isolated of any collaborators data environment. Each collaborator can then add content into the clean room station in the form of data tables and/or executable notebooks.

Figure 7:
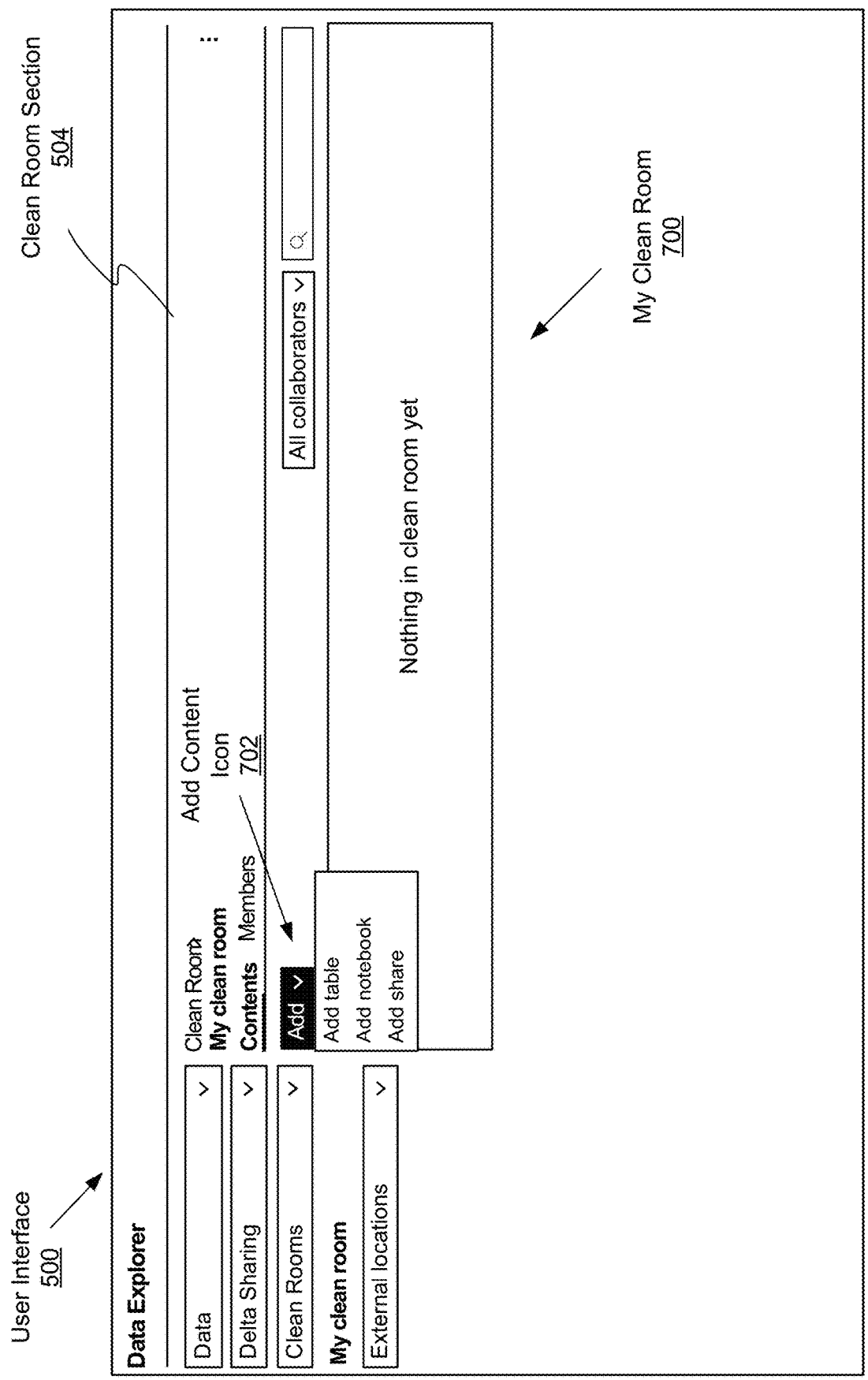
Figure 8:
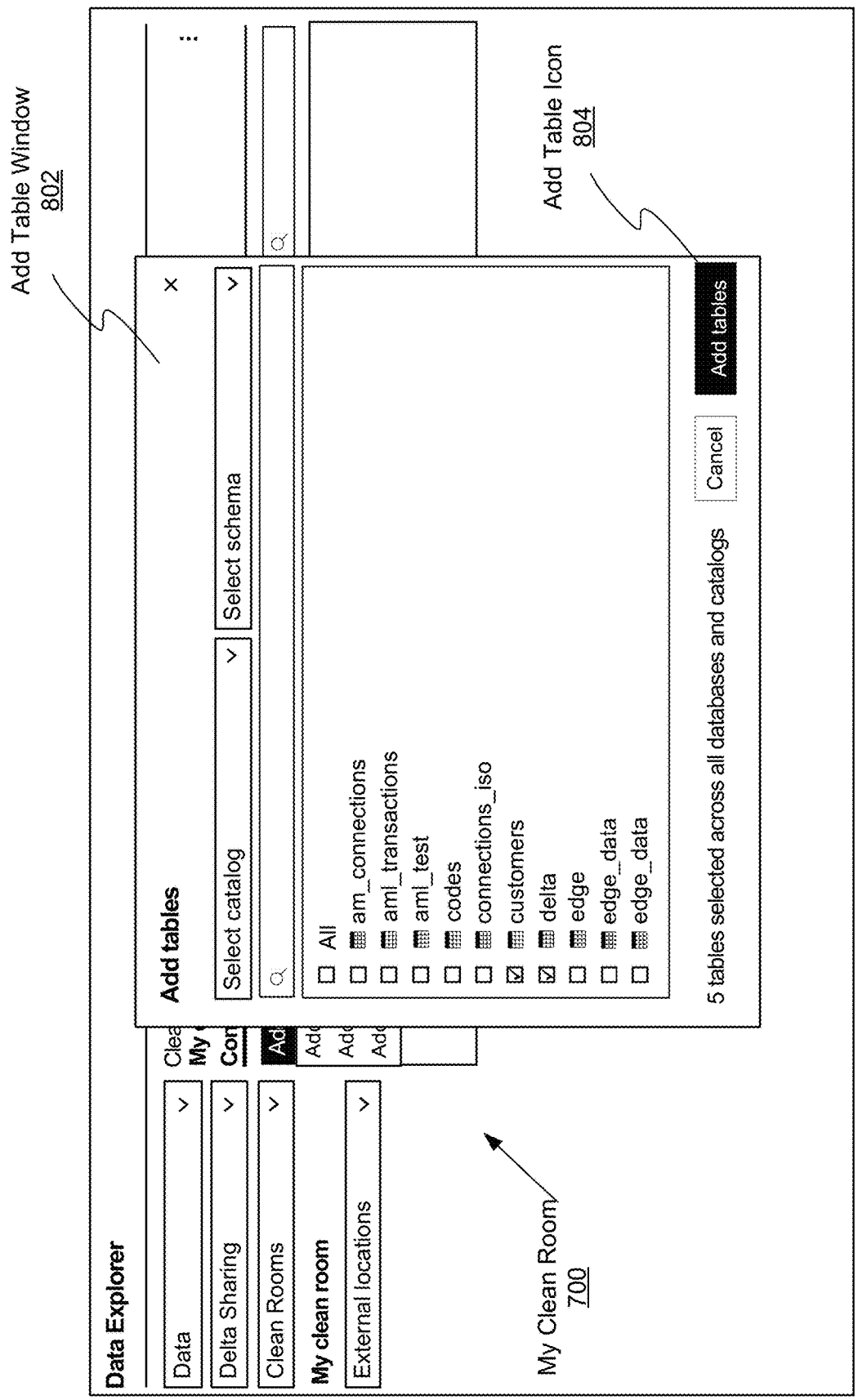
Figure 9:
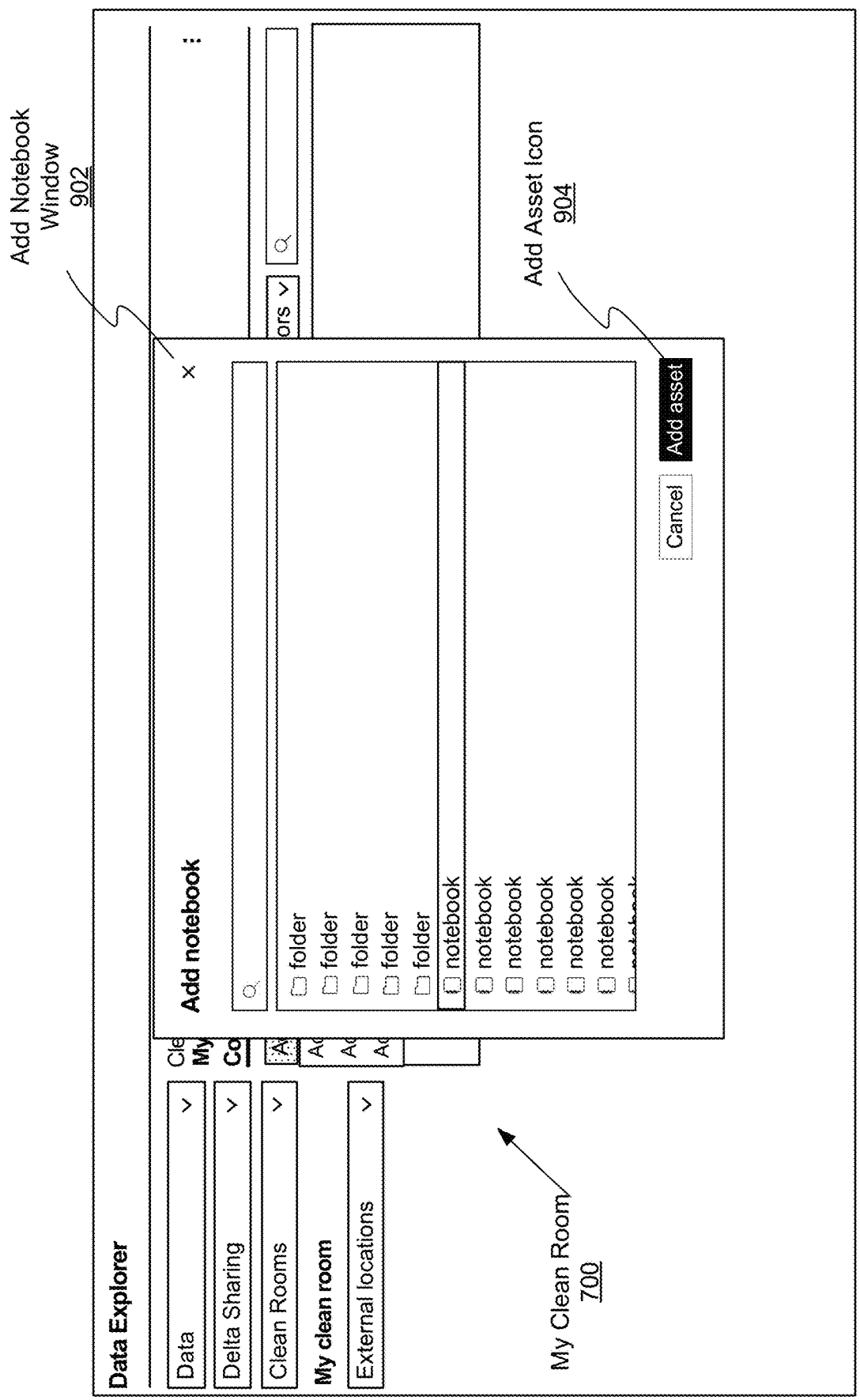

FIGS. 7-9 show examples of content being added into new my clean room 700, in accordance with one or more embodiments. FIG. 7 shows my clean room 700 displayed in the clean room section 504, in accordance with one or more embodiments. Accordingly, in response to selecting create icon 604, data processing service 102 creates new my clean room 700 and it is now available in clean room section 504 of their user's account. Additionally, FIG. 7 show an example first step for adding content (e.g., a data table, notebook, or to add a share) into my clean room 700. In this example, once a user has selected and enters available clean room, as the user has entered my clean room 700 shown in FIG. 7, a add content icon 702 is presented that allows the user to add content into the clean room. Accordingly, upon selecting add content icon 702, a drop-down menu is presented with options for selecting content to add to the clean room.

FIG. 8 illustrates an example showing add table window 802 for adding a table into my clean room 700, in accordance with one or more embodiments. In this example, the user selected add content icon 702, was presented with the drop-down menu, and selected to "add table" to add one or more tables to my clean room 700. In response to the selection, user interface 500 presents add table window 802. Add table window 802, in this example, presents the user with a list of the data tables they have stored with data processing service 102. Each table is presented on add table window 802 with a check-box provided adjacent that, when selected along with add table icon 804, causes the selected data tables to be added to my clean room 700. Accordingly, in this example, the user selects two data tables (i.e., the data tables named "customers" and "delta") to be added to my clean room 700.

FIG. 9 illustrates an example showing add notebook window 902 for adding a notebook into my clean room 700, in accordance with one or more embodiments. In this example, the user selected add content icon 702, was presented with the drop-down menu, and selected to "add notebook" to add one or more notebooks to my clean room 700. In response to the selection, user interface 500 presents add notebook window 902. Add notebook window 902, in this example, presents the user with a list of notebooks and folders that include notebooks that they have stored with data processing service 102. As in adding a table, each notebook is presented on add notebook window 902 with a check-box provided adjacent that, when selected along with add asset icon 904, causes the selected notebooks and/or folders to be added to my clean room 700. Similarly, upon creating my clean room 700, other collaborators added to my clean room 700 by the user will be able to add data tables and notebooks as described in FIGS. 8-9.

FIG. 10 illustrates an example showing create job window 1002 for creating a job within data processing service 102, in accordance with one or more embodiments. Create job window 1002 allows a user to name a particular task, select the type of job (e.g., clean room, general notebook, Java Archive, pipeline task, Python, Scala, Spark submit, Java application, etc.), specify the notebook and/or data tables to be used in the job, specify the output location, and other task options. For example, a clean room job type causes the job to be executed on clusters in an isolated clean room (i.e., secure isolated cluster computing resource, such as 1208 in FIG. 12), while non-clean room (notebook) jobs are spun-up on clusters associated with the user's data environment. Once the user has selected the necessary parameters, they select create job icon 1004 to create the job.

In one embodiment, responsive to receiving a request to execute the notebook job, the control layer 106 provisions a separate clean room station including a station metastore and a station workspace for the collaboration. The cluster resources for a clean room station task and the cluster resources associated with workspaces for one or more users of the data processing service 102 may be located in different virtual private clouds (VPC's). A VPC isolates computing resources from the other computing resources available in the cloud infrastructure. A VPC for a workspace may isolate from other workspaces via subnets (range of IP addresses within a network), VLAN, and/or virtual private networks (VPN's), by allowing only users associated with the VPC to access resources within the VPC. Thus, in one embodiment, cluster resources for a workspace for a user of the data processing service 102 may be located within a first VPC and cluster resources for a clean room station workspace may be located within a second VPC different from the first VPC. In one embodiment, the cluster computing resources for the clean room station are executed within a serverless data plane that runs within a network boundary for the workspace and is managed by the data processing service 102. The serverless data plane includes various layers of security to isolate different customer or user workspaces and additional network controls between clusters of the same user.

Figure 11:
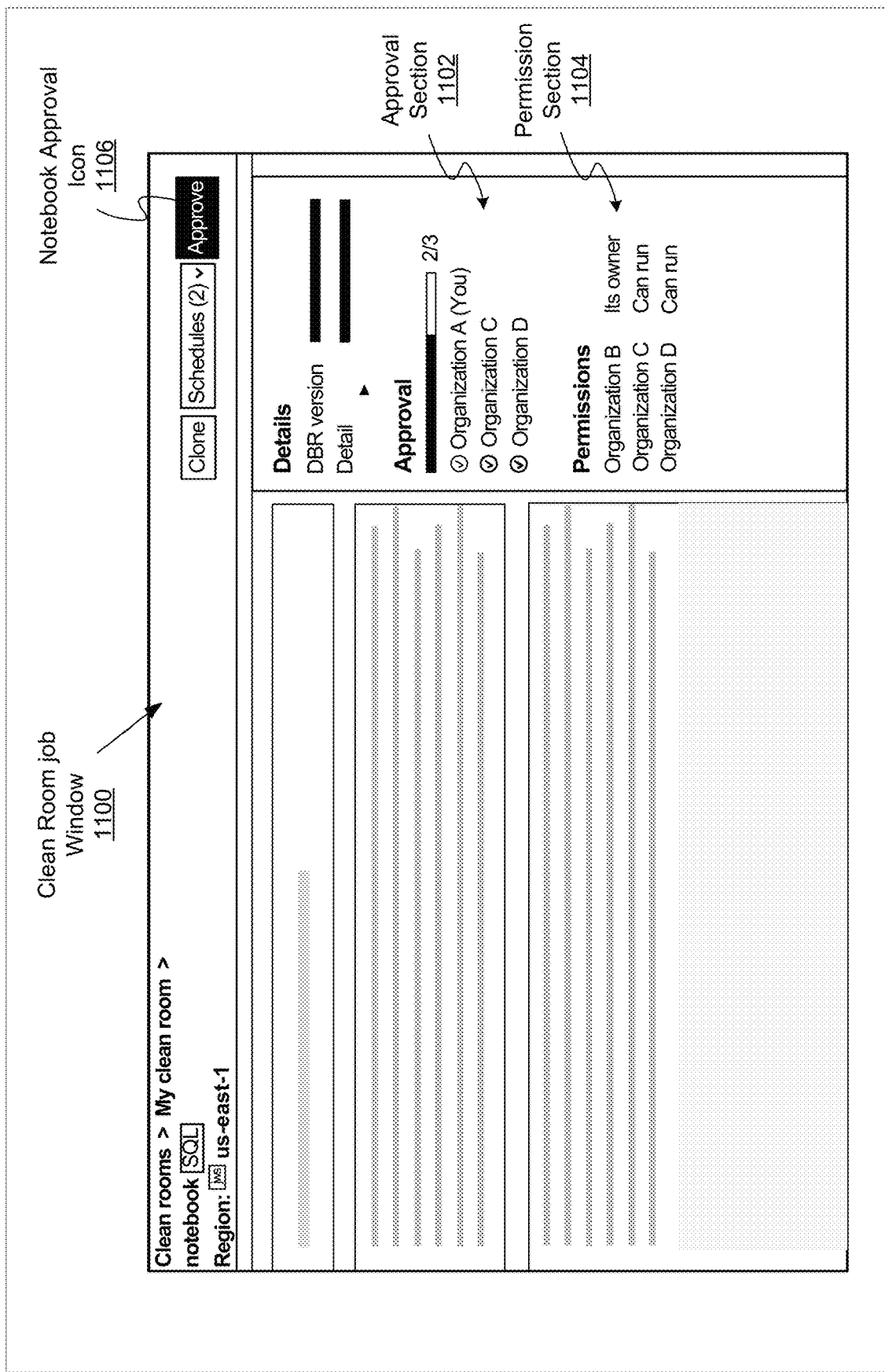

FIG. 11 illustrates an example showing clean room job window 1100, in accordance with one or more embodiments. Clean room job window 1100 shows approval section 1102, permission section 1104, and notebook approval icon 1106. Approval from each collaborator is required before a notebook can be executed using any data table shared into the clean room station 700. In this example, there are three collaborators (i.e., Organization A, Organization B, Organization C, and Organization D) that have been added to clean room 700 (i.e., added via clean room creation window 600, as described in FIG. 6). Thus, in this example, approval section 1102 indicates that Organization C and Organization D have reviewed and approved the notebook to run the clean room job; Organization B is the notebook's owner and has, therefore, provided implied approval since they would have uploaded the notebook into clean room 700; and approval is still pending from Organization A, from whose perspective clean room job window 1100 is depicted. Accordingly, upon receiving notebook approval from each collaborator, the data processing service 102 creates a notebook job to execute the notebook on one or more cluster computing resources of the data processing service 102 to generate an output. Thus, to approve the notebook, a user of Organization A selects notebook approval icon 1106 after reviewing the notebook.

Requiring each collaborator to approve the notebook used to analyze the data shared into the clean room 700 before the notebook can be executed ensures data security and equality among collaborators. This includes requiring approval after changes are made to the notebook by one or more of the collaborators. Thus, in one embodiment, data processing service 102 will not execute a notebook unless approval is received from each collaborator. To achieve this requirement, in one embodiment, data processing service 102 generates a notebook approval hash for each collaborator's approval by combining a notebook content hash with one or more properties of clean room station 700. Thus, the notebook content hash prevents an approved notebook from being executed after the notebook has been modified.

Figure 12:
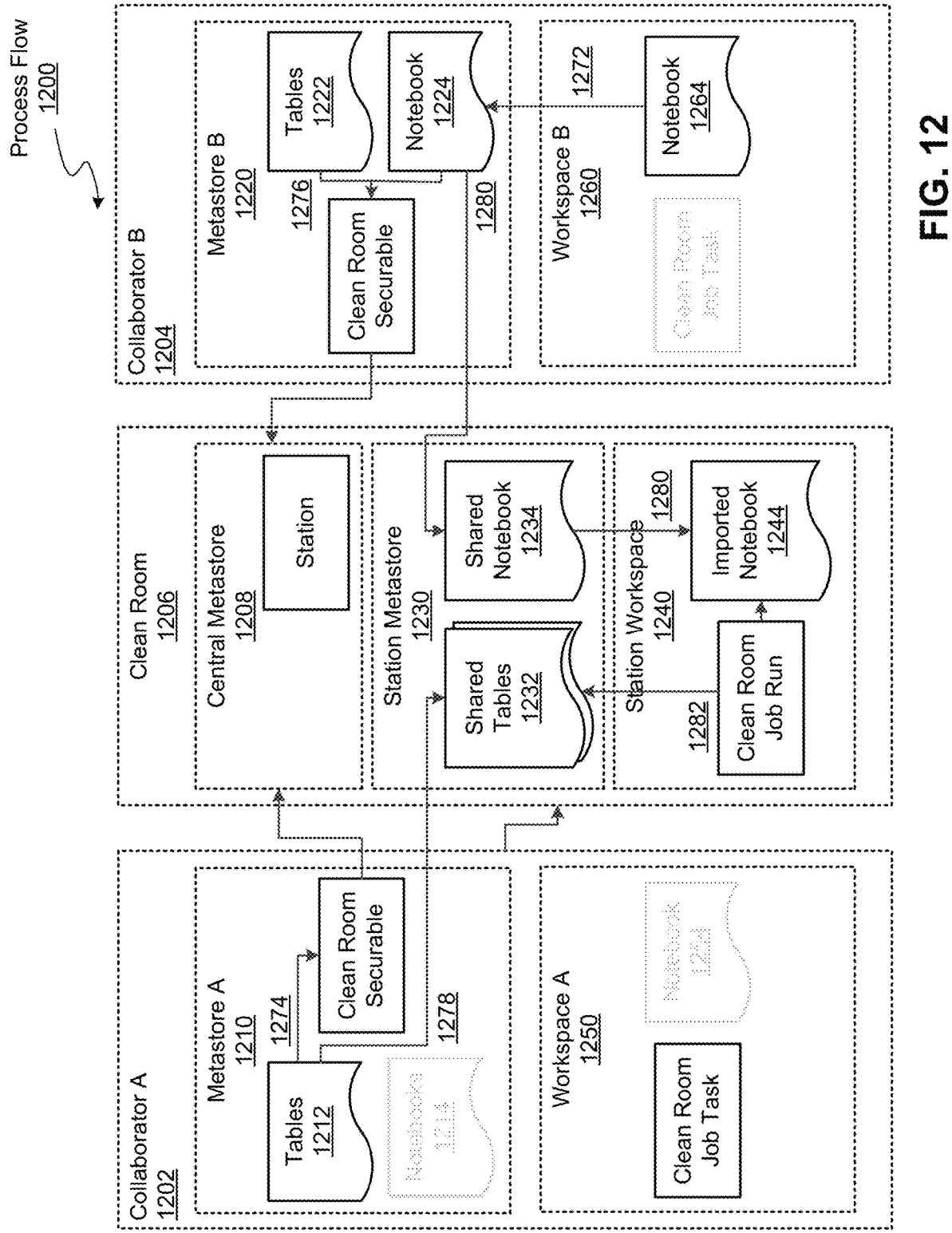
FIG. 12 illustrates a process flow diagram for executing a clean room task, in accordance with an embodiment.

FIG. 12 illustrates a process flow 1200 for executing a clean room task between an account pertaining to Collaborator A 1202 and an account pertaining to Collaborator B 1204, in accordance with one embodiment. In this example, process flow 1200 is executed within data processing service 102 and Collaborator A 1202 and Collaborator B 1204 each have an account with data processing service 102. Thus, the account of Collaborator A 1202 includes metastore A 1210 and workspace A 1250. The account of Collaborator B 1204 includes metastore B 1220 and workspace A 1260. Metastore A 1210 and metastore B 1220 store permissions and other metadata for their respective account owners that govern access to data objects. Specifically, metastore A 1210 stores access data to one or more tables 1212 owned by Collaborator A and notebooks 1214, while metastore B 1220 stores access data to one or more tables 1222 owned by Collaborator B and notebooks 1224.

In the example process flow 1200 shown in FIG. 12, a user associated with Collaborator B creates a clean room environment with Collaborator A (e.g., as shown in FIGS. 5-6). In one embodiment, the data processing service 102 creates a central clean room account 1206 that is a central hub for one or more clean room stations. In another embodiment, the data processing service 102 may create an ephemeral clean room account 1206 when a clean room collaboration between two or more collaborators is requested and tear down the clean room account 1206 once the collaboration is completed or terminated. In one instance, when a collaborator adds data assets (e.g., data tables or views) to a clean room account via a clean room securable, the data assets are not actually shared to the clean room environment, but rather is a set of configurations for identifying the clean room account 1206 for the collaboration.

Responsive to a user request, the data processing service 102 adds 1272 a notebook for the clean room task to a container associated with the clean room in metastore B 1220 (e.g., as shown in FIG. 9). As described above, the notebook may reference one or more data assets from Collaborators A and B. Therefore, the user also adds one or more tables 1222 owned by Collaborator B to the container for the clean room (e.g., as shown in FIG. 8). Similarly, the data processing service 102 adds one or more tables 1212 owned by Collaborator A to a container for the clean room in metastore A 1210. In one instance, the data assets are stored in the data storage system 110 (e.g., cloud object storage) associated with the collaborator, while the notebook 1224 is a materialized version of the notebook 1264 stored in workspace B 1260. In other words, the tables 1212 in metastore A and tables 1222 in metastore B represent the storage of metadata and permissions that govern access to the tables rather than the actual data of the tables (which are stored in cloud object storage dedicated to the respective owner).

The data processing service 102 links data assets and notebooks to a respective clean room securable in each of the collaborator's metadata stores. In FIG. 12, the tables 1212 are linked 1274 to a clean room securable in metastore A 1210 and tables 1222 and notebook 1224 are linked 1276 to a clean room securable in metastore B 1220. In one instance, a clean room securable is a local representation and/or a proxy to the clean room environment and indicates permissions on which assets will be shared to the clean room account 1206. The clean room securable may be linked to the central clean room account 1206. In one instance, the clean room securable is a row or a column extracted from a database and includes information such as the identifier for the clean room account 1206, data assets and notebooks associated with the clean room, and the like. Therefore, the clean room account 1206 is able to identify the notebooks and data assets that are linked to the clean room account 1206 from all collaborators. The collaborators may explicitly or implicitly approve the notebook for the clean room.

The data processing service receives a request to execute a notebook job based on the notebook (e.g., as shown in FIG. 10). Responsive to the request, the data processing service 102 (e.g., clean room module 330) creates a clean room station including a station metastore 1230 and a station workspace 1240 within the clean room account 1206. In one instance, the request to execute the notebook is submitted to a workflows module in the control layer 106 responsible for creating and scheduling various types of data processing jobs. The workflows module provides the request to an orchestrator service, such as the clean room module 330 in the control layer 106, and the clean room module 330 creates the clean room station including the station metastore 1230 and station workspace 1240 for collaboration. In one embodiment, a collaborator different from the collaborator who added the notebook for execution is only allowed to request execution of the notebook.

Responsive to creation of the clean room station, the central metastore 1208 for the central clean room account 1206 requests the collaborators (e.g., Collaborators A and B) to share data assets and notebooks for the clean room to the station metastore. In the example of FIG. 12, the central metastore 1208 may provide the identifier for the station metastore 1230 to metastore A 1210 and metastore B 1220, such that data assets and notebooks can be shared to the station metastore 1230. Accordingly, Collaborator A 1202 shares 1278 tables 1212 into station metastore 1230 by, for example, configuring the station metastore 1230 as recipient entity via a recipient securable that specifies the identifier for the recipient station metastore 1230. Similarly, Collaborator B 1204 shares 1280 tables 1222 and notebook 1224 by, for example, configuring the station metastore 1230 as recipient entity via another recipient securable. In turn, the station metastore 1230 configures a provider securable for metastore A 1210 and metastore B 1220 as provider entities, and also receives information on tables 1232 and notebooks 1234 shared with the station metastore 1230.

The data processing service 102 creates a service principal for executing the notebook job in the station workspace 1240. The data processing service 102 imports the shared notebook 1234 into the station workspace 1240. In one instance, the service principal has minimum privileges to run the notebook job (read-only access to tables and notebooks). As described above, a notebook is executable code that can be used to create data science and machine learning workflows and, in this example, the cluster compute resources deployed within the station workspace 1240 executes notebook 1244 by accessing the shared tables 1232 as input and computes a output between collaborators. The cluster compute resources are able to access the shared data tables from the data storage system 110 of the respective collaborator who shared them into the clean room station based on the provider and recipient securable configurations described above. The data processing service 102 obtains the results of the execution and saves the results in the workspace of the collaborator that initiated the request.

In one embodiment, the clean room job is executed within a serverless data layer or data plane that is managed or owned by the data processing service 102, rather than data layers 108 configured with compute clusters dedicated to a user or customer of the data processing service 102 within the customer's VPC. Thus, the clean room job is executed within a separate VPC of the data processing service 102, isolated from the data layers 108 of Collaborators A and B. After execution and completion of the notebook job, the clean room module 330 tears down the clean room station.

A Method for Creating a Clean Room Station and Executing a Clean Room Task

Figure 13:
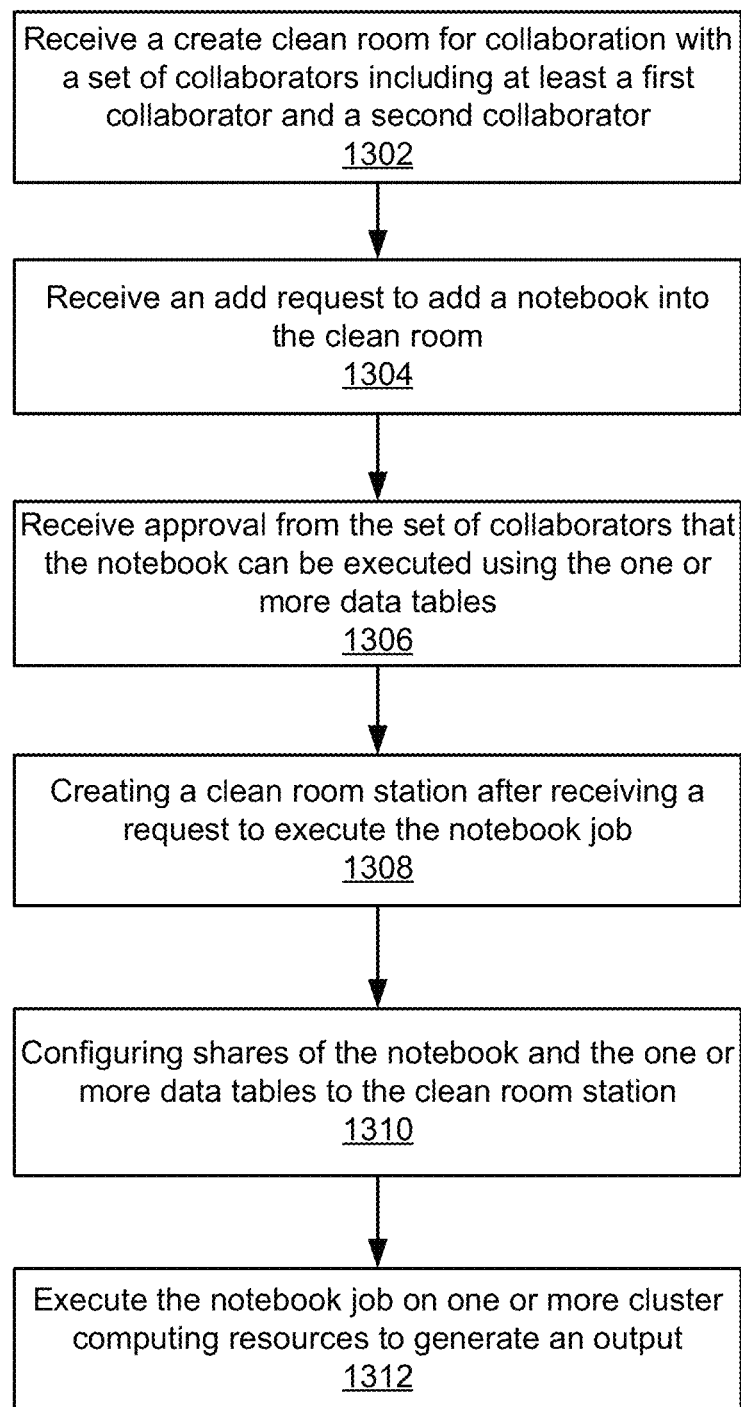
FIG. 13 illustrates a method for creating a clean room station and executing a clean room task, in accordance with an embodiment.

FIG. 13 is a flowchart of a method for creating a clean room station and executing a clean room task, in accordance with an embodiment. The method shown in FIG. 13 may be performed by one or more components (e.g., the control layer 106) of a data processing system/service (e.g., the data processing service 102). Other entities may perform some or all of the steps in FIG. 13. Embodiments may include different and/or additional steps, or perform the steps in different orders.

The method for creating a clean room station and executing a clean room task begins when data processing service 102 receives 1302 a create clean room request for data sharing collaboration between a set of collaborators including at least a first collaborator and a second collaborator. Accordingly, the create clean room request is made via a user interface of a collaborator's user account where they can provide the sharing identifier of the collaborator, name the clean room, specify the cloud and region, specify a location to store an output of the clean room job, among other configurable clean room parameters. Additionally, the collaborator may add any number of collaborators to the clean room. The clean room may be associated with a clean room account and a central metastore.

The data processing service 102 receives 1304, from the set of collaborators, add requests to add one or more notebooks or data assets to the clean room. In one embodiment, the data processing service 102 configures clean room securables within each collaborator's metastore that the collaborator can link notebooks or data assets to the central clean room metastore. The data processing service 102 receives 1306 approval from the set of collaborators that the notebook can be executed. In one embodiment, each collaborator—other than the party who uploads the notebook since their approval is implied—is required to review and approve of a notebook before data processing service 102 will execute the notebook.

In one embodiment, the data processing service 102 generates a notebook approval hash for each approval that is generated by combining a notebook content hash and one or more properties of the clean room. The notebook content hash, in one embodiment, prevents an approved notebook from being executed after the notebook has been modified. Subsequent approval is required from each collaborator to execute the notebook after the notebook has been modified. The notebook content hash prevents running a notebook that was not approved, in this example, by the second collaborator who uploaded the notebook.

In response to receiving the notebook approval from the first collaborator, the data processing service 102 receives a request to execute the notebook job. In response to receiving the request, data processing service 102 creates 1308 a clean room station. During the clean room creation process, a clean room station and metastore are created in a specified cloud and region. Further, as described elsewhere herein, the clean room station is an execution environment separate from the data environment of each collaborator and is isolated from the data environment of the first collaborator and the second collaborator to ensures that no collaborator has greater privileges than another.

The data processing service 102 configures 1310 shares of the notebook and the one or more data tables to the clean room station metastore. Specifically, the central metastore may request each collaborator metastore to share any notebooks and data assets for the clean room to the station metastore. The data processing service 102 executes 1312 the notebook job using one or more compute cluster resources within the clean room station workspace. The outputs of the notebook job are stored to a workspace of a collaborator. When the job is completed, the clean room station (as well as the clean room account) may be torn down.

Clean Room Tasks in a Data Processing Pipeline

A data processing pipeline implements steps to move data from one or more source systems, transform that data based on a set of requirements, and store the data in a target system. For example, a data processing pipeline may include three separate notebook jobs where a first notebook ingests raw data, a second notebook prepares the data, and a third notebook analyzes the data. These tasks are performed in a defined sequence such that the output from one task is then used as input for the subsequent task. A data pipeline might prepare data so data analysts and data scientists can extract value from the data through analysis and reporting.

Some of the tasks in a data pipeline can be performed in the execution environment of a requesting user. However, the requesting user may not be the owner of the data being used for a particular task in the data processing pipeline and the data owner may be obligated to not provide the requesting user with direct access to the data but may desire to perform and obtain results for one or more data processing tasks on the data without gaining direct exposure to the sensitive or confidential data. Accordingly, data processing service 102, in one embodiment, offers data processing pipeline integration of clean room tasks.

Figure 14:
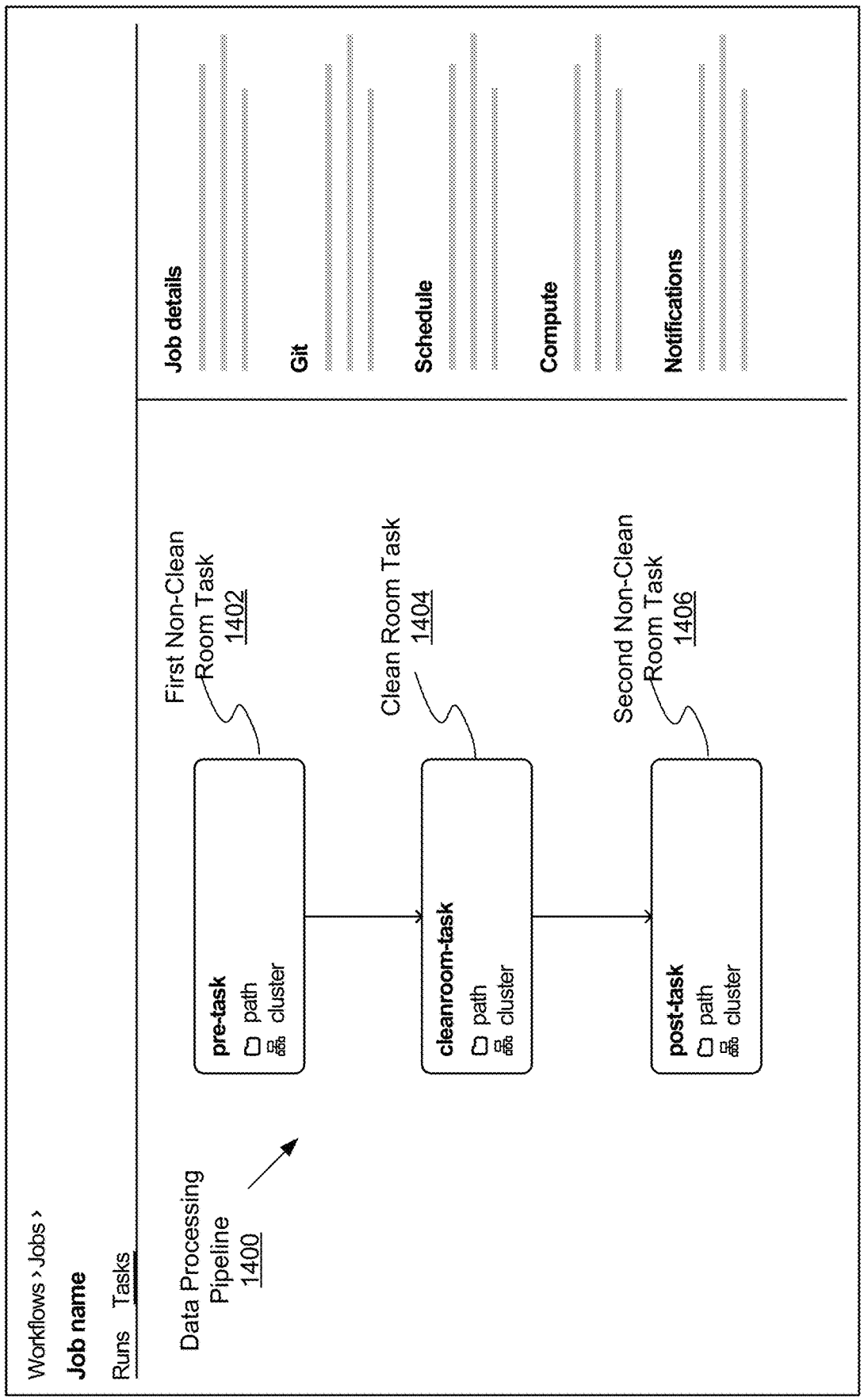
FIG. 14 illustrates a user interface provided by a data processing service for creating a data processing pipeline that includes a mix of clean room and non-clean room tasks, in accordance with an embodiment.

FIG. 14 illustrates an example user interface provided by data processing service 102 for creating data processing pipeline 1400 that includes a mix of clean room and non-clean room tasks, in accordance with an embodiment. In this example, data processing pipeline 1400 includes three tasks: first non-clean room task 1402, clean room task 1404, and second non-clean room task 1406. Accordingly, a user accesses their account with data processing service 102 from a client device and creates (or obtains) a first notebook for first non-clean room task 1402, a second notebook for clean room task 1404, and a third notebook for second non-clean room task 1406. In this example, the second notebook includes code to query the output of first non-clean room task 1402 and the third notebook includes code to query the output of clean room task 1404.

Then, in various embodiments, the user creates a job for each task, as similarly described in FIG. 10, and automates each task to execute in sequence, such that intervention by the user during execution is not required. In one embodiment, there is a workflow option that allows the user to link and schedule tasks. In this example, the user could set a trigger that, when first non-clean room task 1402 is completed, causes the notebook for clean room task 1404 to begin execution (that would automatically without user intervention obtain the output from first non-clean room task 1402 and so forth) of these linked tasks. Further, when creating each task, the user selects a job type. In this example, the user selects a notebook job type for first non-clean room task 1402 and second non-clean room task 1406 and must select clean room job type for clean room task 1404 to be able to select data tables or a notebook provided by another user/collaborator. Accordingly, first non-clean room task 1402 and second non-clean room task 1406 will be executed in the execution environment of the user and clean room task 1404 will be executed in a secure cluster separate and isolated from the execution environment of each user party to the clean room station.

A Method for Mixing Clean Room Tasks

Figure 15:
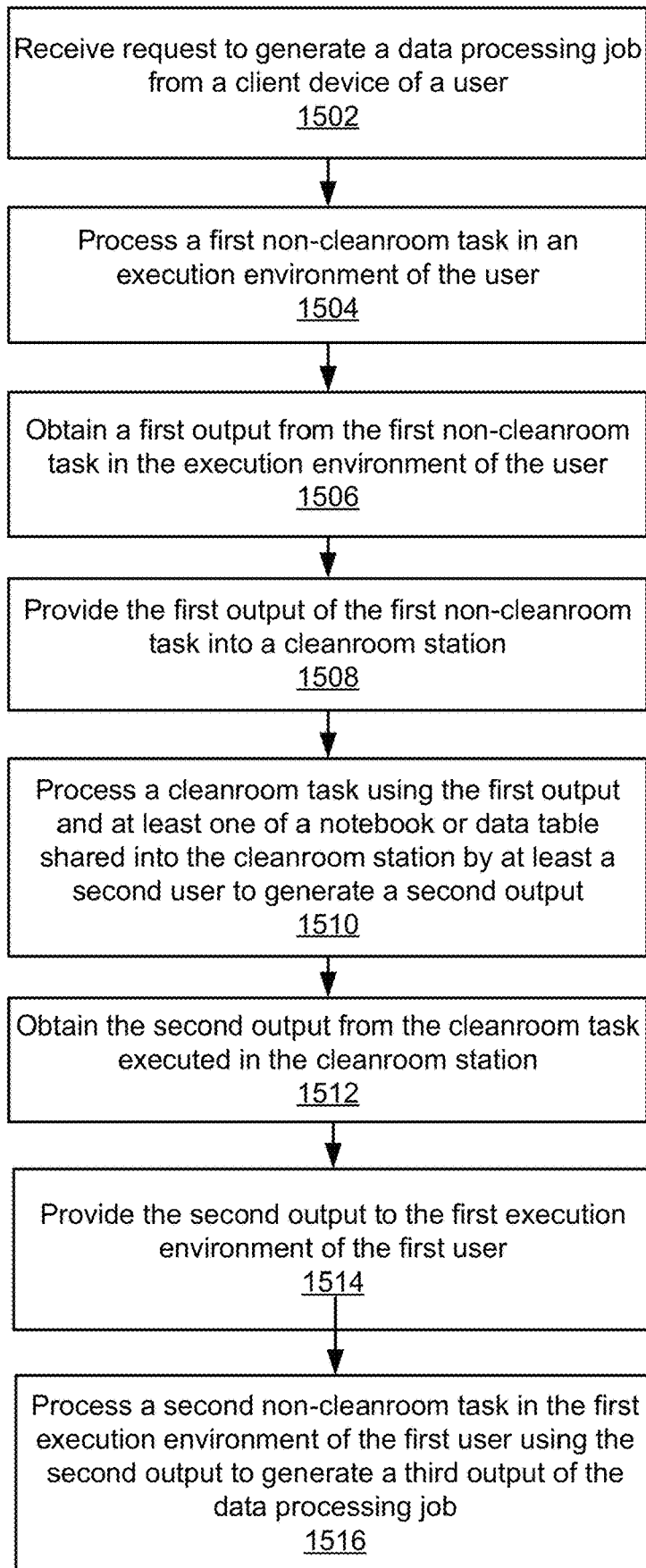
FIG. 15 illustrates a method for creating a data processing pipeline that includes a mix of clean room and non-clean room tasks, in accordance with an embodiment.

FIG. 15 is a flowchart of a method for creating a data processing pipeline that includes a mix of clean room and non-clean room tasks, in accordance with an embodiment. The process shown in FIG. 15 may be performed by one or more components (e.g., the control layer 106) of a data processing system/service (e.g., the data processing service 102). Other entities may perform some or all the steps in FIG. 15. The data processing service 102 as well as the other entities may include some of the components of the machine (e.g., computer system) described in conjunction with FIG. 16. Embodiments may include different and/or additional steps or perform the steps in different orders.

Data processing service 102 receives 1502 a request to generate a data processing job from a client device of a user. The data processing job is defined with respect to a set of tasks defining a data pipeline that includes at least one clean room task that is executed in a clean room station and at least one non-clean room task executed in an execution environment of the first user. Each task is configured to read one or more input datasets and transform the one or more input datasets into one or more output datasets.

Data processing service 102 processes 1504 a first non-clean room task in an execution environment of the user. The data processing service 102 obtains a first output from the first non-clean room task in the execution environment of the user and provides 1508 the first output of the first non-clean room task into a clean room station.

Data processing service 102 then processes 1510 a clean room task using the first output and at least one of a notebook or data table shared into the clean room station by another user to generate a second output of the data processing job. In one embodiment, the clean room task is executed using a notebook provided into the clean room station by the user that uses the first output and a data table from the other user to generate the second output. As described above, data processing service 102 will render the notebook inoperable until approval to run the notebook is received from the other user (i.e., that they approve the use of their data table in this operation). For example, a clean room task may be performed via the processing of sharing assets and executing code on cluster resources associated with the clean room station in the manner described in conjunction with FIG. 12.

In another embodiment, the clean room task is executed using a notebook provided into the clean room station by the other user that uses the first output and the data table from the second user to generate the second output. In this instance, data processing service 102 will render the notebook inoperable until approval to run the notebook using the first output is received from the user (i.e., other than the providing party, each clean room party needs to approve a notebook before it can be executed).

The clean room task is processed in the clean room station that is managed by data processing service 102 and is separate and isolated from the execution environments of either the user or an execution environment of the other user. Thus, in one embodiment, the first non-clean room task is executed on one or more first cluster computing resources of data processing service 102 and the clean room task is executed on a different one or more second cluster computing resources of data processing service 102.

Accordingly, data processing service 102 obtains 1512 the second output of the clean room task that was executed in the clean room station and provides 1514 the second output into the execution environment of the user to process a next task of the data processing job. Accordingly, data processing service 102 processes a second non-clean room task in the execution environment of the user using the second output to generate a third output of the data processing job.

Example Computing System

Figure 16:
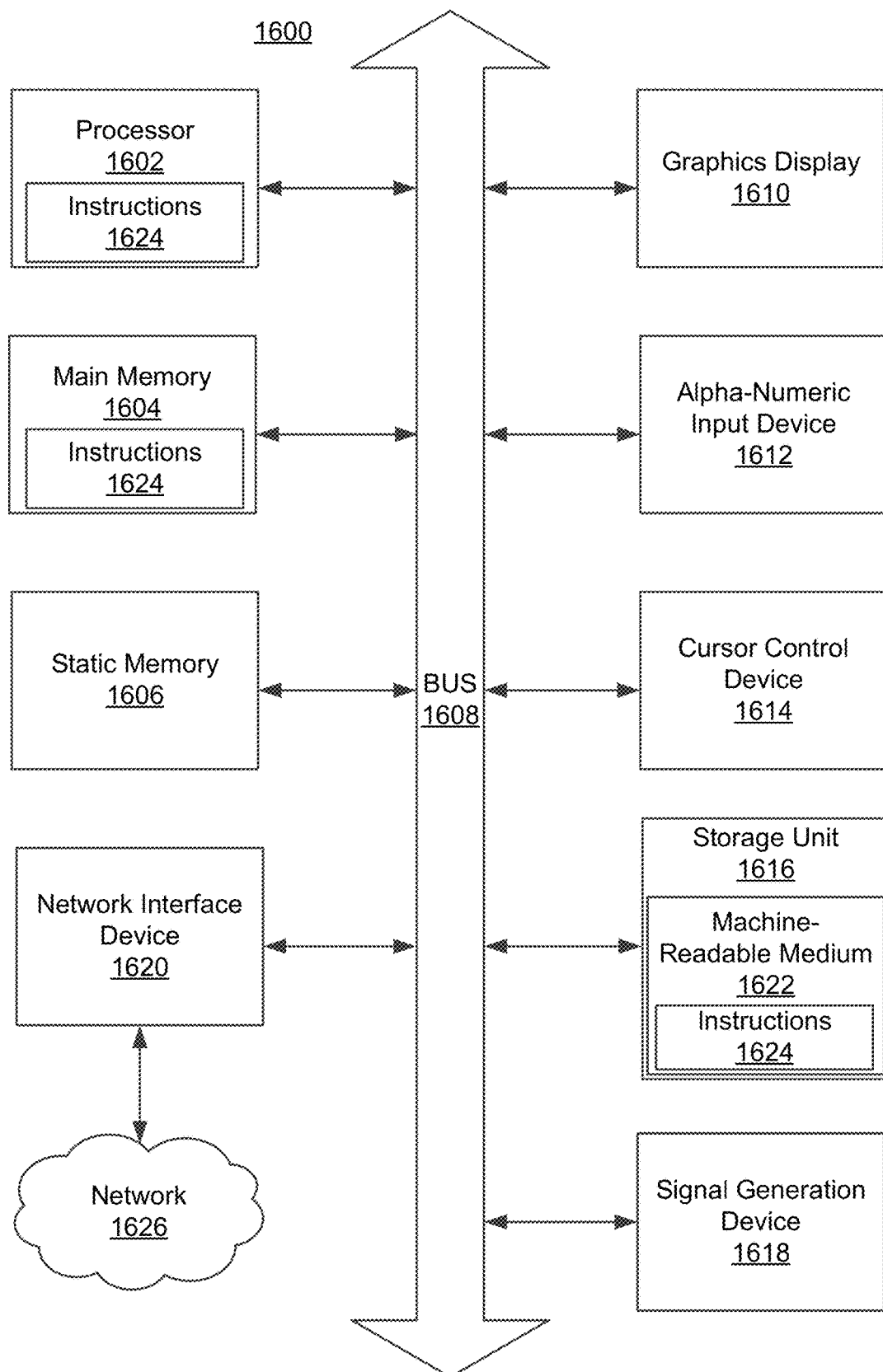
FIG. 16 illustrates is an example machine to read and execute computer readable instructions, in accordance with an embodiment.

Turning now to FIG. 16, illustrated is an example machine to read and execute computer readable instructions, in accordance with an embodiment. Specifically, FIG. 16 shows a diagrammatic representation of the data processing service 102 (and/or data processing system) in the example form of a computer system 1600. The computer system 1600 can be used to execute instructions 1624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes one or more processing units (generally processor 1602). The processor 1602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 1600 also includes a main memory 1604. The computer system may include a storage unit 1616. The processor 1602, memory 1604, and the storage unit 1616 communicate via a bus 1608.

In addition, the computer system 1600 can include a static memory 1606, a graphics display 1610 (e.g., to drive a plasma display panel (PDP), a liquid crystal display (LCD), or a projector). The computer system 1600 may also include alphanumeric input device 1612 (e.g., a keyboard), a cursor control device 1614 (e.g., a mouse, a trackball, a joystick, a motion sensor, or other pointing instrument), a signal generation device 1618 (e.g., a speaker), and a network interface device 1620, which also are configured to communicate via the bus 1608.

The storage unit 1616 includes a machine-readable medium 1622 on which is stored instructions 1624 (e.g., software) embodying any one or more of the methodologies or functions described herein. For example, the instructions 1624 may include instructions for implementing the functionalities of the transaction module 340 and/or the unity catalog module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Summary

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising, at a computer system comprising a processor and a computer-readable medium:
receiving, by a data processing service, an indication to generate a data processing job from a client device of a first user, the data processing job defined with respect to a set of tasks that includes at least one cleanroom task executed in a cleanroom station and at least one non-cleanroom task executed in an execution environment of the first user, each task configured to read one or more input datasets and transform the one or more input datasets into one or more output datasets;
processing, by the data processing service, a first non-cleanroom task in a first execution environment of the first user within a first virtual private cloud (VPC);
obtaining, by the data processing service, a first output from the first non-cleanroom task in the first execution environment of the first user;
providing, by the data processing service, the first output of the first non-cleanroom task into the cleanroom station;
processing, by the data processing service, a cleanroom task using the first output and at least one of a notebook or data table shared into the cleanroom station by at least a second user to generate a second output of the data processing job, wherein the cleanroom task is processed in the cleanroom station that is managed by the data processing service and is separate and isolated from the first execution environment of the first user and a second execution environment of the second user, wherein the cleanroom station is within a second VPC different from the first VPC;
obtaining, by the data processing service, the second output from the cleanroom task executed in the cleanroom station;
providing, by the data processing service, the second output into the first execution environment of the first user; and
processing, by the data processing service, a second non-cleanroom task in the first execution environment of the first user using the second output to generate a third output of the data processing job.

2. The method of claim 1, wherein the first non-cleanroom task and the second non-cleanroom task are executed on one or more first cluster computing resources of the data processing service and the cleanroom task is executed on a different one or more second cluster computing resources of the data processing service.

3. The method of claim 1, wherein the cleanroom task is executed using a first notebook provided into the cleanroom station by the first user, and wherein the notebook uses the first output and the data table from the second user to generate the second output.

4. The method of claim 3, further comprising:
rendering, by the data processing service, the first notebook inoperable until approval to run the first notebook is received from the second user; and
receiving, by the data processing service, notebook approval from the second user that the first notebook can be executed using the data table provided by the second user in order to process the cleanroom task.

5. The method of claim 1, wherein the cleanroom task is executed using the notebook provided into the cleanroom station by the second user, and wherein the notebook uses the first output and the data table from the second user to generate the second output.

6. The method of claim 5, further comprising:
rendering, by the data processing service, the notebook inoperable until approval to run the notebook using the first output is received from the first user; and
receiving, by the data processing service, notebook approval from the first user that the first notebook can be executed using the first output in order to process the cleanroom task.

7. The method of claim 1, further comprising:
receiving, by the data processing service, a request from the first user to share the output of the first non-cleanroom task into the cleanroom.

8. The method of claim 1, wherein the set of tasks of the data processing job are defined in advance by the first user to be executed by the data processing service without intervention from the first user during execution, and wherein the data processing automatically obtains the second output from the cleanroom task executed in the cleanroom station and provides the second output into the first execution environment of the first user in order to process the second non-cleanroom task.

9. A non-transitory computer readable storage medium storing instructions that, when executed by one or more computer processors, causes the one or more computer processors to:
receive an indication to generate a data processing job from a client device of a first user, the data processing job defined with respect to a set of tasks that includes at least one cleanroom task executed in a cleanroom station and at least one non-cleanroom task executed in an execution environment of the first user, each task configured to read one or more input datasets and transform the one or more input datasets into one or more output datasets;
process a first non-cleanroom task in a first execution environment of the first user within a first virtual private cloud (VPC);
obtain a first output from the first non-cleanroom task in the first execution environment of the first user;
provide the first output of the first non-cleanroom task into the cleanroom station;
process a cleanroom task using the first output and at least one of a notebook or data table shared into the cleanroom station by at least a second user to generate a second output of the data processing job, wherein the cleanroom task is processed in the cleanroom station that is managed by a data processing system and is separate and isolated from the first execution environment of the first user and a second execution environment of the second user, wherein the cleanroom station is within a second VPC different from the first VPC;
obtain the second output from the cleanroom task executed in the cleanroom station;
provide the second output into the first execution environment of the first user; and
process a second non-cleanroom task in the first execution environment of the first user using the second output to generate a third output of the data processing job.

10. The non-transitory computer readable storage medium of claim 9, wherein the first non-cleanroom task and the second non-cleanroom task are executed on one or more first cluster computing resources of the data processing system and the cleanroom task is executed on a different one or more second cluster computing resources of the data processing system.

11. The non-transitory computer readable storage medium of claim 9, wherein the cleanroom task is executed using a first notebook provided into the cleanroom station by the first user, and wherein the notebook uses the first output and the data table from the second user to generate the second output.

12. The non-transitory computer readable storage medium of claim 11, wherein the instructions that, when executed by the one or more computer processors, further causes the one or more computer processors to:
render the first notebook inoperable until approval to run the first notebook is received from the second user; and
receive notebook approval from the second user that the first notebook can be executed using the data table provided by the second user in order to process the cleanroom task.

13. The non-transitory computer readable storage medium of claim 9, wherein the cleanroom task is executed using the notebook provided into the cleanroom station by the second user, and wherein the notebook uses the first output and the data table from the second user to generate the second output.

14. The non-transitory computer readable storage medium of claim 13, further comprising:
render the notebook inoperable until approval to run the notebook using the first output is received from the first user; and
receive notebook approval from the first user that the first notebook can be executed using the first output in order to process the cleanroom task.

15. The non-transitory computer readable storage medium of claim 9, wherein the set of tasks of the data processing job are defined in advance by the first user to be executed by the data processing system without intervention from the first user during execution, and wherein the data processing automatically obtains the second output from the cleanroom task executed in the cleanroom station and provides the second output into the first execution environment of the first user in order to process the second non-cleanroom task.

16. A computer system comprising:
a computer processor; and
a non-transitory computer readable storage medium storing instructions that, when executed by one or more computer processors, causes the one or more computer processors to:
receive an indication to generate a data processing job from a client device of a first user, the data processing job defined with respect to a set of tasks that includes at least one cleanroom task executed in a cleanroom station and at least one non-cleanroom task executed in an execution environment of the first user, each task configured to read one or more input datasets and transform the one or more input datasets into one or more output datasets;
process a first non-cleanroom task in a first execution environment of the first user within a first virtual private cloud (VPC);
obtain a first output from the first non-cleanroom task in the first execution environment of the first user;
provide the first output of the first non-cleanroom task into the cleanroom station;
process a cleanroom task using the first output and at least one of a notebook or data table shared into the cleanroom station by at least a second user to generate a second output of the data processing job, wherein the cleanroom task is processed in the cleanroom station that is managed by the computing system and is separate and isolated from the first execution environment of the first user and a second execution environment of the second user, wherein the cleanroom station is within a second VPC different from the first VPC;
obtain the second output from the cleanroom task executed in the cleanroom station;
provide the second output into the first execution environment of the first user; and process a second non-cleanroom task in the first execution environment of the first user using the second output to generate a third output of the data processing job.

17. The computing system of claim 16, wherein the first non-cleanroom task and the second non-cleanroom task are executed on one or more first cluster computing resources of the computing system and the cleanroom task is executed on a different one or more second cluster computing resources of the computing system.

18. The computing system of claim 16, wherein the cleanroom task is executed using a first notebook provided into the cleanroom station by the first user, and wherein the notebook uses the first output and the data table from the second user to generate the second output.

19. The computing system of claim 16, wherein the cleanroom task is executed using the notebook provided into the cleanroom station by the second user, and wherein the notebook uses the first output and the data table from the second user to generate the second output.

20. The computing system of claim 16, wherein the set of tasks of the data processing job are defined in advance by the first user to be executed by the computing system without intervention from the first user during execution, and wherein the data processing automatically obtains the second output from the cleanroom task executed in the cleanroom station and provides the second output into the first execution environment of the first user in order to process the second non-cleanroom task.

\* \* \* \* \*